(12) United States Patent
Kataoka et al.

(10) Patent No.: US 8,740,008 B2
(45) Date of Patent: Jun. 3, 2014

(54) PRESSURE VESSEL

(75) Inventors: Yasuto Kataoka, Kobe (JP); Hiromitsu Hamaguchi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 38 days.

(21) Appl. No.: 13/572,251

(22) Filed: Aug. 10, 2012

(65) Prior Publication Data

US 2013/0048645 A1    Feb. 28, 2013

(30) Foreign Application Priority Data

Aug. 24, 2011    (JP) ................................. 2011-182509

(51) Int. Cl.
| | |
|---|---|
| *F17C 1/08* | (2006.01) |
| *B65D 1/42* | (2006.01) |
| *B65D 1/44* | (2006.01) |
| *B65D 8/08* | (2006.01) |
| *B65D 8/12* | (2006.01) |

(52) U.S. Cl.
USPC ........... 220/581; 220/562; 220/565; 220/608; 220/670; 220/673; 220/675

(58) Field of Classification Search
CPC ........ B65D 11/22; B65D 11/24; B65D 11/26; B65D 1/44; B65D 1/42; B65D 5/5085; F17C 1/08
USPC .............. 220/562–567.3, 581, 592, 608, 609, 220/623, 624, 645, 669–675
See application file for complete search history.

(56) References Cited

U.S. PATENT DOCUMENTS

| | | | | |
|---|---|---|---|---|
| 2,893,588 | A  * | 7/1959 | Martin ......................... | 220/4.28 |
| 6,595,382 | B2 * | 7/2003 | Ettlinger ................... | 220/560.11 |
| 8,070,005 | B1 * | 12/2011 | Kruger et al. ................ | 220/4.13 |

FOREIGN PATENT DOCUMENTS

| | | |
|---|---|---|
| JP | 2002-012182 | 1/2002 |
| JP | 2003-106668 A | 4/2003 |
| JP | 2010-243015 | 10/2010 |

OTHER PUBLICATIONS

Lim, O-Kaung et al., "Optimization of Reinforcement of Thin-Walled Structures for a Natural Frequency", Journal of the Computational Structural Engineering Institute of Korea, Jun. 2006, pp. 195-202, vol. 19, Issue 2.

* cited by examiner

*Primary Examiner* — Fenn Mathew
*Assistant Examiner* — Don M Anderson
(74) *Attorney, Agent, or Firm* — Juan Carlos A. Marquez; Morris, Manning & Martin, LLP

(57) ABSTRACT

A pressure vessel having reduced weight while satisfying required design conditions has polygonal upper and bottom walls, a side wall provided therebetween, an upper curved surface portion for connecting the upper and side walls, and a lower curved surface portion for connecting the bottom and side walls. An upper wall center rib includes an upper wall center part, and upper wall annular ribs respectively connecting substantially center parts of the upper wall and surrounding the upper wall center rib. Ribs are formed substantially centrally in the upper curved surface portion. A bottom wall center rib includes a center part in the bottom wall. Bottom wall annular ribs are formed connecting the bottom wall and surrounding the bottom wall center rib. Lower curved surface portion ribs are formed substantially centrally in the lower curved surface portion, and main surface ribs are formed substantially centrally in the side wall.

6 Claims, 8 Drawing Sheets

PLATE THICKNESS OF VESSEL: 17 mm
PLATE THICKNESS OF Y-DIRECTION RIB: 23 mm
PLATE THICKNESS OF X-DIRECTION RIB: 46 mm

MODEL OF CONVENTIONAL VESSEL

FIG. 7

WEIGHT AND CHARACTERISTIC COMPARISON OF GAS COOLER

| GAS COOLER MODEL | ENTIRE WEIGHT (kg) | WEIGHT RATIO TO CONVENTIONAL VESSEL | MAX. DISPLACEMENT AT 1.14 MPa (mm) | MAX. VON MISES STRESS AT 8.19 MPa (MPa) |
|---|---|---|---|---|
| CONVENTIONAL VESSEL WITH CRISSCROSS REINFORCEMENT RIB | 254 | — | 1.36 | 425 |
| VESSEL OF PRESENT INVENTION | 170 | 0.67 | 1.12 | 420 |

FIG. 8

PRESSURE VESSEL

BACKGROUND OF THE INVENTION

1. Field of the Invention

The present invention relates to a pressure vessel used as a compressor gas cooler or the like.

2. Description of the Related Art

In general, the mechanically best shape for a pressure vessel is a spherical shape, and the second best shape is a cylindrical shape. However, for example in a case of a pressure vessel used as a compressor gas cooler, there is a need for considering connection to other major parts, members, and a piping system, a shape of a heat exchanger accommodated in the pressure vessel, further, an installment place of the pressure vessel itself, and the like. Therefore, in order to effectively utilize a space in the device, the shape is preferably a rectangular parallelepiped. For example, Japanese Unexamined Patent Application Publication No. 2003-106668 discloses a rectangular parallelepiped pressure vessel. It should be noted that the rectangular parallelepiped pressure vessel is not only limited to the compressor gas cooler but also frequently used in other machines and devices.

In addition, the pressure vessel requires design conditions of rigidity and strength. In the above rectangular parallelepiped pressure vessel described in Japanese Unexamined Patent Application Publication No. 2003-106668, grid shape ribs are provided in an outer periphery of the vessel in order to satisfy the required design conditions.

In general, as a pressure vessel, there is a need for reducing as much weight as possible while satisfying the required design conditions. However, in the pressure vessel described in Japanese Unexamined Patent Application Publication No. 2003-106668, the weight is increased for the grid shape ribs provided in the outer periphery of the vessel, and thus, it cannot be said that the weight can be reduced.

SUMMARY OF THE INVENTION

This invention is achieved in order to solve the problems as described above, and an object thereof is to provide a pressure vessel capable of reducing weight while satisfying required design conditions.

In order to solve the above problem, the present inventors focused on the fact that non-uniformity is generated in stress distribution generated by action of internal pressure of an accommodated high-pressure medium in walls of the pressure vessel. That is, the present inventors focused on the fact that the walls have parts where only relatively small stress is generated, and these parts are an excessively reinforced structure. Therefore, the present inventors found that instead of the structure in which the grid shape ribs directly connecting to a weight increase of the pressure vessel are provided, by cutting off the excessively reinforced parts in order to solve the generated non-uniformity of the stress distribution, materials can be decreased and the weight can be reduced.

The present invention is achieved from such a viewpoint to provide a pressure vessel, having a polygonal upper wall, a polygonal bottom wall provided on the lower side of the upper wall, a side wall provided between a peripheral edge of the upper wall and a peripheral edge of the bottom wall corresponding to the peripheral edge, an upper curved surface portion for connecting the peripheral edge of the upper wall and an upper end of the side wall by curved surfaces convexed outward, and a lower curved surface portion for connecting the peripheral edge of the bottom wall and a lower end of the side wall by curved surfaces convexed outward, the pressure vessel including an upper wall center rib formed so as to include an upper wall center part in center of the upper wall and extend in a specific direction, upper wall annular ribs formed so as to respectively connect substantially center parts of adjacent sides of the upper wall and surround the upper wall center rib, upper curved surface portion ribs formed in substantially center parts of sides of the upper curved surface portion and provided continuously to the upper wall center rib and the upper wall annular ribs, a bottom wall center rib formed so as to include a bottom wall center part in center of the bottom wall and extend in a specific direction, bottom wall annular ribs formed so as to respectively connect substantially center parts of adjacent sides of the bottom wall and surround the bottom wall center rib, lower curved surface portion ribs formed in substantially center parts of sides of the lower curved surface portion and provided continuously to the bottom wall center rib and the bottom wall annular ribs, and main surface ribs formed in substantially center parts of main surfaces of the side wall and provided continuously to the upper curved surface portion ribs and the lower curved surface portion ribs.

According to the pressure vessel of this invention, by providing the ribs having large thickness in the parts where relatively large stress is generated, that is, the upper wall center part, the part annularly surrounding the upper wall center part, the substantially center parts of the sides of the upper curved surface portion, the bottom wall center part, the part annularly surrounding the bottom wall center part, the substantially center parts of the sides of the lower curved surface portion, and the substantially center parts of the main surfaces, and reducing thickness of other parts where only relatively small stress is generated, as the entire pressure vessel, while the required design conditions are satisfied, the materials can be decreased and the weight can be reduced. Generation of the non-uniformity of the stress distribution in the upper wall, the side wall, and the bottom wall of the pressure vessel can be suppressed.

In the present invention, preferably, the upper wall center rib has an upper wall center rib main body including the upper wall center part, an upper wall center rib continuous portion provided continuously to the upper curved surface portion rib, and an upper wall center rib thin portion formed between the upper wall center rib main body and the upper wall center rib continuous portion so as to be the thinnest in the upper wall center rib, and has a shape in which thickness thereof is gradually reduced from a center part of the upper wall center rib main body toward the upper wall center rib thin portion, the upper wall annular rib has an upper wall annular rib main body, an upper wall annular rib continuous portion provided continuously to the upper curved surface portion rib, and an upper wall annular rib thin portion formed between the upper wall annular rib main body and the upper wall annular rib continuous portion so as to be the thinnest in the upper wall annular rib, the bottom wall center rib has a bottom wall center rib main body including the bottom wall center part, a bottom wall center rib continuous portion provided continuously to the lower curved surface portion rib, and a bottom wall center rib thin portion formed between the bottom wall center rib main body and the bottom wall center rib continuous portion so as to be the thinnest in the bottom wall center rib, and has a shape in which thickness thereof is gradually reduced from a center part of the bottom wall center rib main body toward the bottom wall center rib thin portion, and the bottom wall annular rib has a bottom wall annular rib main body, a bottom wall annular rib continuous portion provided continuously to the lower curved surface portion rib, and a bottom wall annular rib thin portion formed between the bottom wall annular rib main body and the bottom wall annular rib continuous portion so as to be the thinnest in the bottom wall annular rib.

In such a way, by increasing the thickness of the parts where relatively large stress is generated and reducing the thickness of the parts where only relatively small stress is generated in the ribs, while the required design conditions are satisfied, the materials can be further decreased and the weight can be reduced. The generation of the non-uniformity of the stress distribution in the upper wall and the bottom wall of the pressure vessel can be further suppressed.

In the present invention, preferably, an inner surface of the upper curved surface portion and an inner surface of the lower curved surface portion have the same curvature radius, the upper wall center rib thin portion is positioned within a range of one half to twice more than the curvature radius from an inner surface of the side wall toward the upper wall center part when the upper wall is seen from the upper side, and the bottom wall center rib thin portion is positioned within a range of one half to twice more than the curvature radius from the inner surface of the side wall toward the bottom wall center part when the bottom wall is seen from the lower side.

In such a way, while the non-uniformity of the stress distribution generated in the upper wall and the bottom wall is solved, the weight of the pressure vessel can be easily reduced.

In the present invention, preferably, the upper wall center rib thin portion and the upper wall annular rib thin portion are positioned in a part where a positive bending moment generated in the upper wall at the time of action of internal pressure and a negative bending moment generated in the upper curved surface portion are balanced, and the bottom wall center rib thin portion and the bottom wall annular rib thin portion are positioned in a part where a positive bending moment generated in the bottom wall at the time of action of internal pressure and a negative bending moment generated in the lower curved surface portion are balanced.

In such a way, the upper wall center rib thin portion and the upper wall annular rib thin portion are positioned in the part where the positive bending moment in the upper wall and the negative bending moment are balanced, that is, in the part where extremely small stress is generated, and the bottom wall center rib thin portion and the bottom wall annular rib thin portion are positioned in the same part in the bottom wall. Thus, thickness of these thin portions can be more reduced, so that the weight of the pressure vessel can be further reduced.

In the present invention, preferably, the upper wall and the bottom wall are square.

In such a way, an internal space of the pressure vessel is easily effectively ensured.

As described above, according to the present invention, the pressure vessel capable of decreasing the materials and reducing the weight while satisfying the required design conditions can be provided.

DESCRIPTION OF THE PREFERRED EMBODIMENTS

Figure 4:
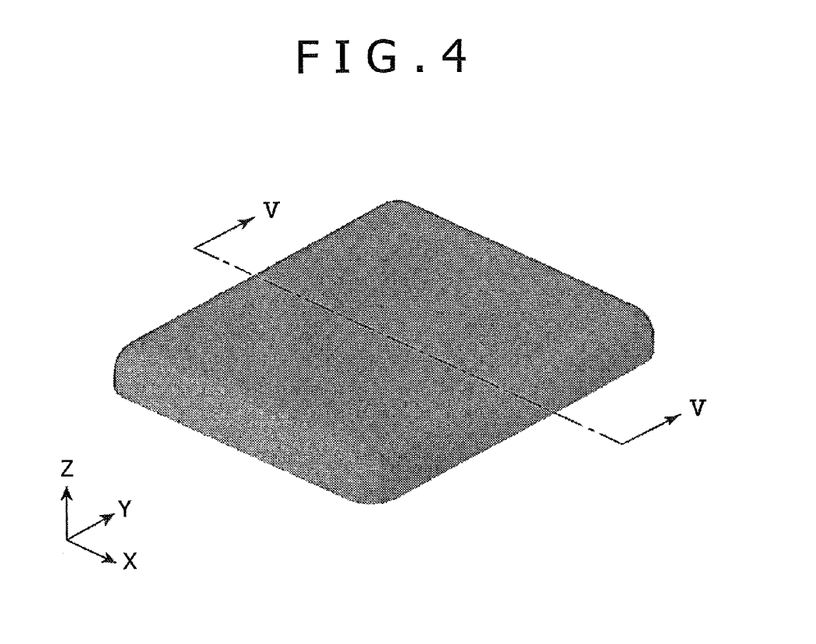
FIG. 4 is a perspective view of a half model of a rectangular parallelepiped pressure vessel.

In a case where internal pressure acts onto a rectangular parallelepiped pressure vessel, the vessel is basically deformed so as to be close to a spherical body. Firstly, this point will be described with reference to FIGS. 4 and 5. FIG. 4 is a perspective view of a half model of the rectangular parallelepiped pressure vessel. It should be noted that FIG. 4 shows an upper wall of the rectangular parallelepiped pressure vessel.

Figure 5:
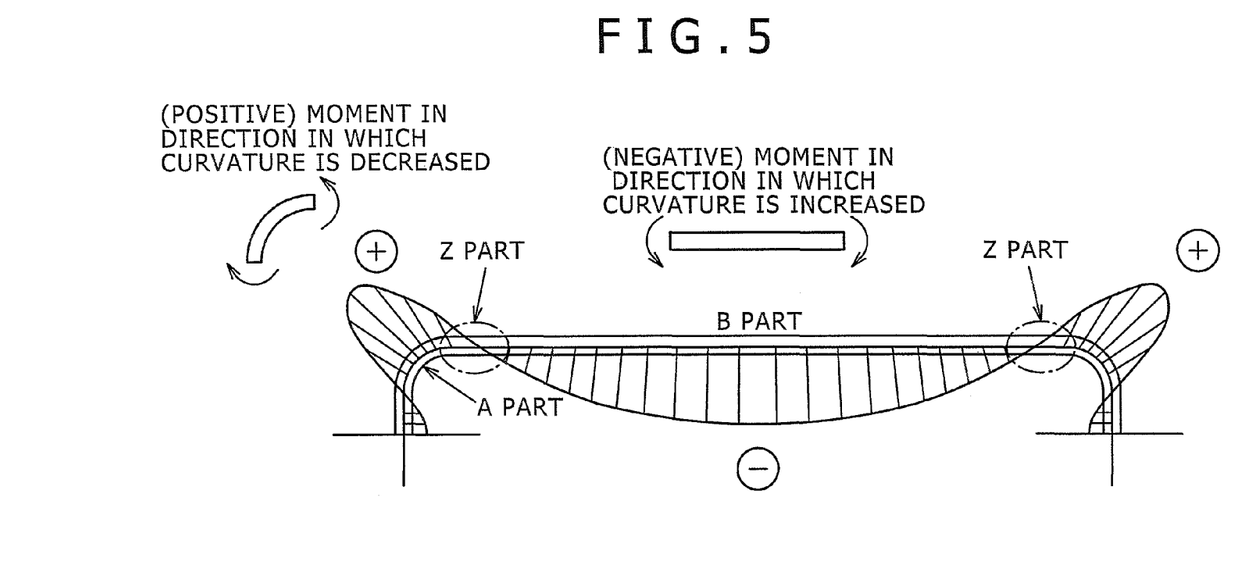
FIG. 5 is a view for illustrating distribution of bending moments generated in a section by the line V-V of FIG. 4.

FIG. 5 schematically shows a distribution diagram of bending moments applied to a section by the line V-V of FIG. 4. In an A part in the figure, a bending moment in the direction in which a curvature is decreased, that is, a positive bending moment is applied. Meanwhile, in a B part, a bending moment in the direction in which the curvature is increased, that is, a negative bending moment is applied. At this time, in the vicinity of a Z part, positive and negative of the bending moment is reversed. Thus, the moment becomes zero or takes a very small value.

In the present embodiment, positions of ribs provided in a pressure vessel and thickness thereof substantially correspond to a magnitude of the moments distributed as above. That is, basically, thick ribs are provided in a part where an absolute value of the moment is large, and thickness of a part where an absolute value is zero or small is reduced.

In such a way, since the positions of the ribs provided in the pressure vessel and the thickness thereof correspond to the magnitude of the moments, a load is uniformly applied over the entire vessel. Thus, the pressure vessel can be formed in a wasteless shape. In other words, the conventional rectangular parallelepiped pressure vessel is formed in a shape that even a part where only a relatively small bending moment is generated has ribs having the same thickness as a part where a relatively large bending moment is generated. Thus, the part is excessively reinforced as extra thickness, and leads to an increase in weight.

Next, a preferred embodiment of the present invention will be described with reference to the drawings.

Figure 1:
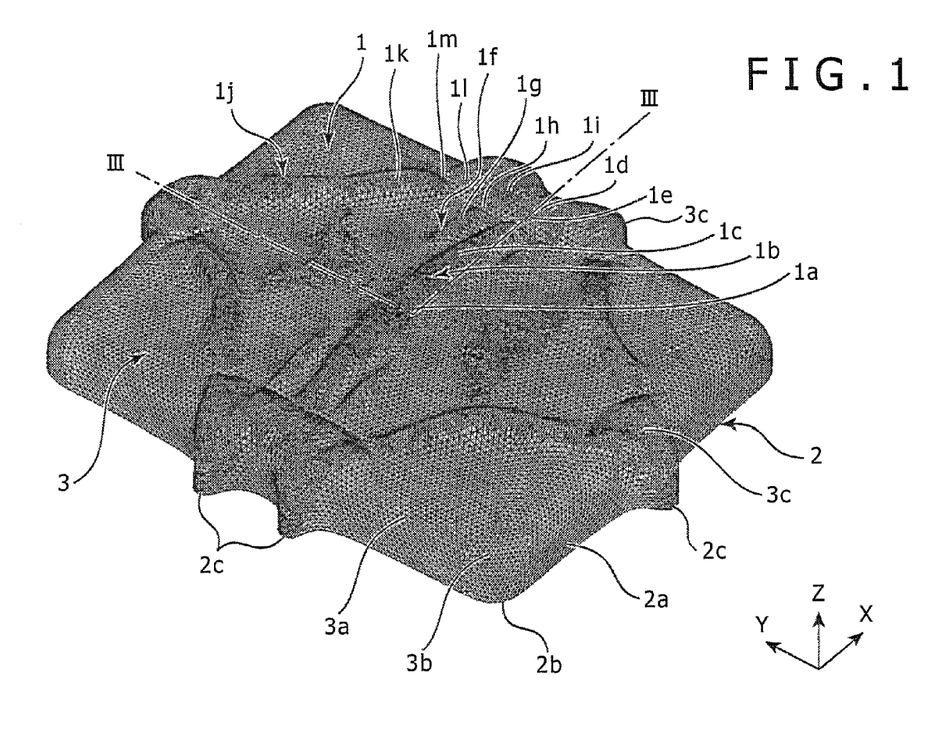
FIG. 1 is a perspective view of a half model of a pressure vessel according to one embodiment of the present invention.
Figure 2:
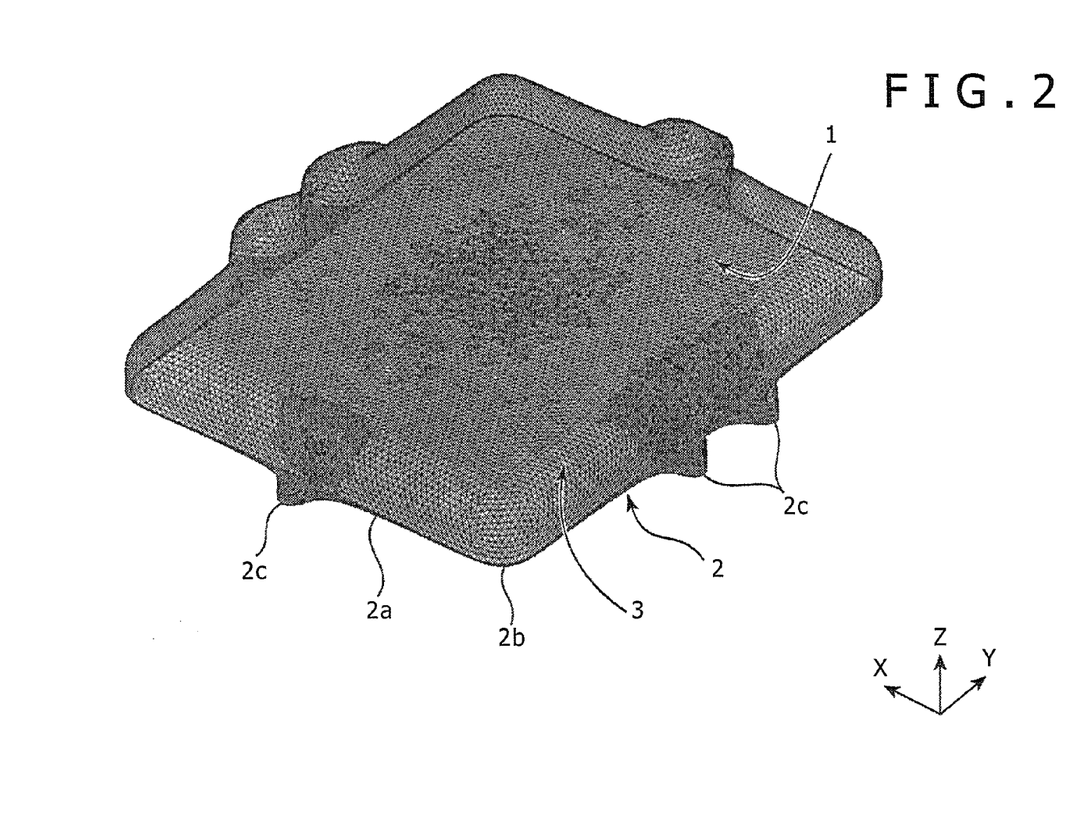
FIG. 2 is a perspective view of a state showing an inner surface of the model shown in FIG. 1.
Figure 3:
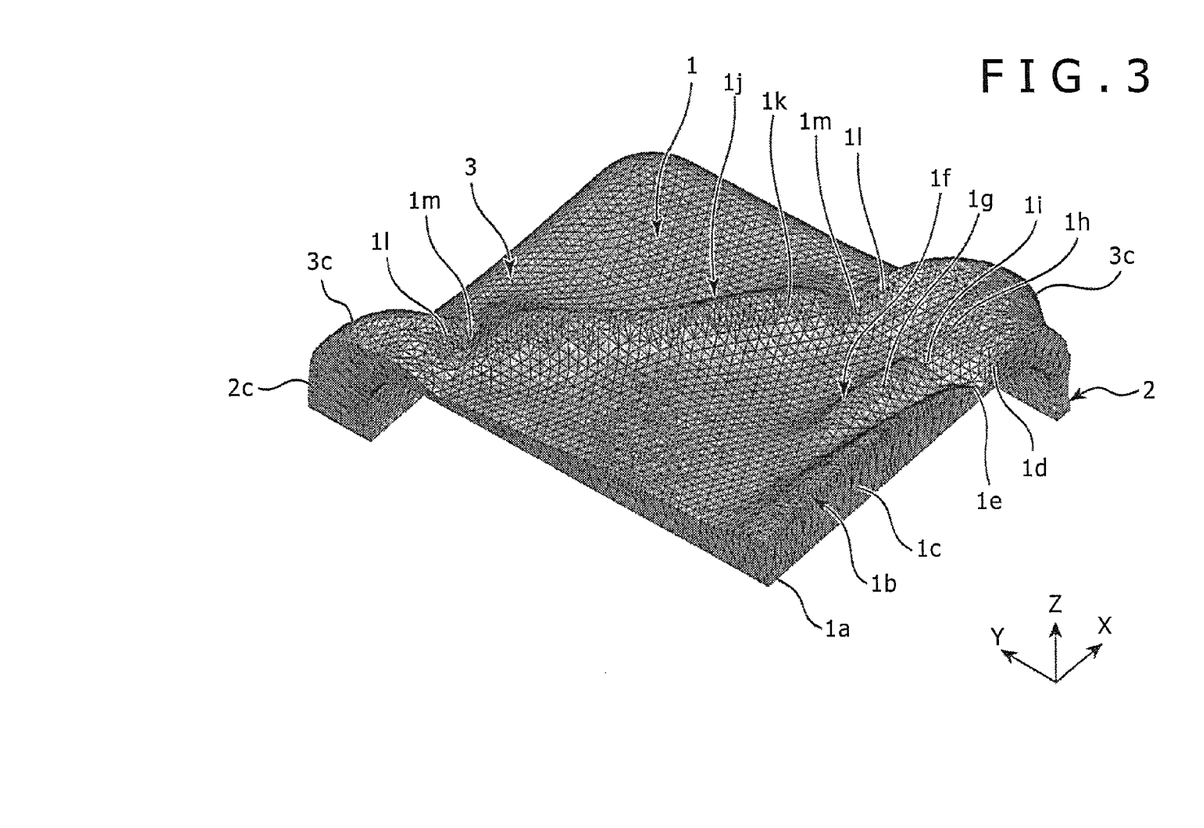
FIG. 3 is a perspective view of a section by the line of FIG. 1.

FIG. 1 is a perspective view of a half model of a pressure vessel according to one embodiment of the present invention. The pressure vessel of the present embodiment is formed in a symmetrical shape relative to center of the Z directions. Thus, description will be given with using the half model in which the pressure vessel is cut at the center of the Z directions. It should be noted that FIG. 1 shows an upper wall of the pressure vessel of the present embodiment. FIG. 2 is a perspective view of a state that the model shown in FIG. 1 is seen from the minus Z direction, that is, a state showing an inner surface of the upper wall. FIG. 3 is a perspective view showing a state that the model of FIG. 1 is cut by a section by the line III-III.

As shown in FIG. 1, the half model of the pressure vessel of the present embodiment has an upper wall 1, a side wall 2 provided between the upper wall 1 and a bottom wall (not shown), and an upper curved surface portion 3 for connecting a peripheral edge of the upper wall 1 and an upper end of the side wall 2 by curved surfaces convexed outward. Although this pressure vessel also has a heat exchanger, pipes, and the like inside thereof, these parts are not shown in the figures.

The upper wall 1 has an upper wall center rib 1b formed so as to include an upper wall center part 1a in center thereof and extend in a specific direction (X axis direction), upper wall auxiliary ribs 1f formed in the vicinity of this upper wall center rib 1b, and upper wall annular ribs 1j formed so as to respectively connect substantially center parts of adjacent sides of the upper wall 1. As shown in FIG. 2, an inner surface of the upper wall 1 is flatly formed.

As shown in FIG. 3, the upper wall center rib 1b has an upper wall center rib main body 1c including the upper wall center part 1a, upper wall center rib continuous portions 1d provided continuously to upper curved surface portion ribs 3c described later, and upper wall center rib thin portions 1e formed between the upper wall center rib main body 1c and the upper wall center rib continuous portions 1d so as to be the thinnest in the upper wall center rib 1b. In the upper wall center part 1a, stress generated in the upper wall center part 1a due to action of internal pressure of a high-pressure medium is the largest in the vessel. Thus, thickness of center of the upper wall center rib main body 1c in the upper wall center rib 1b is formed to be the largest in the upper wall center rib 1b. Thickness of this upper wall center rib 1b is gradually reduced from the upper wall center part 1a to the upper wall center rib thin portions 1e, and the upper wall center rib has a shape in which an outer surface thereof is connected by curved surfaces convexed outward. Specifically, the thickness of the thickest part of the upper wall center rib 1b is preferably 2.5 to 8 times more than thickness of the upper wall center rib thin portions 1e.

The upper wall center rib thin portion 1e is formed so as to be positioned within a range of one half to twice more than a curvature radius r of an inner surface of the upper curved surface portion 3 described later from an inner surface of a main surface 2a of the side wall 2 connected to the upper wall center rib continuous portion 1d toward the upper wall center part 1a. More preferably, the upper wall center rib thin portion 1e is formed in a part where a positive bending moment generated in the upper wall and a negative bending moment generated in the upper curved surface portion 3 are balanced, that is, the part where the sum of the bending moments is zero or a very small value. An outer surface of this upper wall center rib thin portion 1e is formed in a curved surface convexed inward. The thickness of the upper wall center rib thin portion 1e may be larger or smaller than, or the same as thickness of the upper wall 1 in the vicinity of corner portions 3b described later.

One pair of upper wall auxiliary ribs 1f is formed in the vicinity of each of ends in the longitudinal direction of the upper wall center rib 1b so as to assist the upper wall center rib 1b with a load applied onto the upper wall center rib. The upper wall auxiliary rib 1f has a shape extending in the parallel direction to the longitudinal direction of the upper wall center rib 1b, and has an upper wall auxiliary rib main body 1g, an upper wall auxiliary rib continuous portion 1h provided continuously to the upper curved surface portion rib 3c, and an upper wall auxiliary rib thin portion 1i formed between the upper wall auxiliary rib main body 1g and the upper wall auxiliary rib continuous portion 1h so as to be the thinnest in the upper wall auxiliary rib 1f. An outer surface of this upper wall auxiliary rib 1f is formed in a curved surface convexed inward in the part of the upper wall auxiliary rib thin portion 1i and convexed outward in other parts.

The upper wall annular ribs 1j are formed so as to connect substantially center parts of adjacent sides of the upper wall 1. This upper wall annular rib 1j has a curved shape in which a center part thereof comes close to the upper wall center part 1a away from a line segment joining the substantially center parts of the adjacent sides of the upper wall 1. The upper wall annular rib 1j has an upper wall annular rib main body 1k, upper wall annular rib continuous portions 1l provided continuously to the upper curved surface portion ribs 3c, and upper wall annular rib thin portions 1m formed between the upper wall annular rib main body 1k and the upper wall annular rib continuous portions 1l so as to be the thinnest in the upper wall annular rib 1j.

The upper wall annular rib thin portion 1m is formed so as to be positioned within a range of one half to twice more than the curvature radius r of the inner surface of the upper curved surface portion 3 from a substantially center part of an inner surface of the main surface 2a connected to a predetermined side of the upper wall 1 toward a substantially center part of an inner surface of the main surface 2a connected to a side adjacent to the predetermined side. More preferably, the upper wall annular rib thin portion 1m is formed in the part where the positive bending moment generated in the upper wall and the negative bending moment generated in the upper curved surface portion 3 are balanced, that is, the part where the sum of the bending moments is zero or a very small value. An outer surface of the upper wall annular rib thin portion 1m is formed in a curved surface convexed inward.

The side wall 2 is provided between the peripheral edge of the upper wall 1 and a peripheral edge of the bottom wall. The side wall 2 has the main surfaces 2a serving as surfaces parallel to a XZ plane in FIG. 1 and the main surfaces 2a serving as surfaces parallel to an YZ plane, and main surface coupling portions 2b for coupling these main surfaces 2a. The main surfaces 2a have main surface ribs 2c in substantially center parts thereof. In the present embodiment, since the upper wall 1 is formed in a rectangular shape elongated in one direction (Y direction), one main surface rib 2c is formed in a short side (side parallel to an X axis) and two main surface ribs 2c are formed in a long side (side parallel to a Y axis). As shown in FIG. 2, the inner surfaces of the main surfaces 2a are flatly formed.

The main surface coupling portion 2b is a part for coupling the main surfaces 2a extending in the directions orthogonal to each other, and has a curved shape convexed outward. As shown in FIG. 2, this main surface coupling portion 2b has a curved inner surface for coupling flat inner surfaces of the main surfaces 2a.

The main surface rib 2c is formed in a center part in the main surface 2a where stress generated in the main surface 2a at the time of the action of the internal pressure of the high-pressure medium is the largest. The main surface rib 2c is respectively connected to the upper curved surface portion rib 3c at an upper end thereof, and connected to a lower curved surface portion rib (not shown) at a lower end thereof.

The upper curved surface portion 3 is a part for connecting the peripheral edge of the upper wall 1 and the upper end of the side wall 2 by the curved surfaces convexed outward, and has side portions 3a corresponding to the sides of the upper wall 1, and the corner portions 3b for coupling the adjacent side portions 3a. The upper curved surface portion ribs 3c are formed in center parts of the side portions 3a.

As shown in FIG. 2, the side portion 3a has a curved inner surface for connecting the flat inner surface of the upper wall 1 and the flat inner surface of the main surface 2a. The corner portion 3b has a curved inner surface for coupling the curved inner surfaces of the adjacent side portions 3a and connecting the inner surface of the upper wall 1 and the inner surface of the main surface coupling portion 2b. The corner portion 3b is formed so that thickness thereof is the smallest in the upper curved surface portion 3. As shown in FIG. 2, the inner surface of the upper curved surface portion 3 is formed in an arc shape having the predetermined curvature radius r.

The upper curved surface portion rib 3c is formed in a center part of the side portion 3a where stress generated in the side portion 3a at the time of the action of the internal pressure of the high-pressure medium is the largest. The upper curved surface portion rib 3c positioned in the long side is provided continuously to the upper wall center rib continuous portion 1d, the upper wall auxiliary rib continuous portions 1h, and the upper wall annular rib continuous portions 1l at an upper end thereof, and provided continuously to the main surface ribs 2c at a lower end thereof. The upper curved surface portion rib 3c positioned in the short side is provided continuously to the upper wall annular rib continuous portions 1l at an upper end thereof, and provided continuously to the main surface rib 2c at a lower end thereof.

It should be noted that since a compressor gas cooler is manufactured by a casting method, even a vessel having changeable thickness as in the present embodiment can be manufactured.

As described above, according to the pressure vessel of the present embodiment, by providing the ribs having large thickness in the parts where relatively large stress is generated, that is, the upper wall center part 1a, the part annularly surrounding the upper wall center part 1a, the substantially center parts of the sides of the upper curved surface portion 3, a bottom wall center part, a part annularly surrounding the bottom wall center part, substantially center parts of sides of the lower curved surface portion, and the substantially center parts of the main surfaces 2a, and reducing thickness of other parts where only relatively small stress is generated, as the entire pressure vessel, while required design conditions are satisfied, materials can be decreased and weight can be reduced. Generation of non-uniformity of stress distribution in the upper wall 1, the bottom wall, and the side wall 2 of the pressure vessel can be suppressed.

In the present embodiment, the upper wall center rib 1b has a shape in which the thickness thereof is gradually reduced from the upper wall center part 1a to the upper wall center rib thin portions 1e, and the upper wall annular ribs 1j have the upper wall annular rib thin portions 1m. A bottom wall center rib has a shape in which thickness thereof is gradually reduced from the bottom wall center part to bottom wall center rib thin portions, and bottom wall annular ribs have bottom wall annular rib thin portions. In such a way, by increasing the thickness of the parts where relatively large stress is generated and reducing the thickness of the parts where only relatively small stress is generated in the ribs, while the required design conditions are satisfied, the materials can be further decreased and the weight can be reduced. The generation of the non-uniformity of the stress distribution in the upper wall 1 of the pressure vessel can be further suppressed.

In the present embodiment, the inner surfaces of the upper curved surface portion 3 and a lower curved surface portion have the same curvature radius r, the upper wall center rib thin portions 1e are positioned within a range of one half to twice more than the curvature radius r from an inner surface of the side wall 2 toward the upper wall center part 1a when the upper wall 1 is seen from the upper side, and the bottom wall center rib thin portions are positioned within a range of one half to twice more than the curvature radius r from the inner surface of the side wall 2 toward the bottom wall center part when the bottom wall is seen from the upper side. Thus, while the non-uniformity of the stress distribution generated in the upper wall 1 and the bottom wall is solved, the weight of the pressure vessel can be easily reduced.

In the present embodiment, the upper wall center rib thin portions 1e and the upper wall annular rib thin portions 1m are positioned in the part where the positive bending moment generated in the upper wall 1 at the time of the action of the internal pressure and the negative bending moment generated in the upper curved surface portion 3 are balanced, that is, in the part where extremely small stress is generated, and the bottom wall center rib thin portions and the bottom wall annular rib thin portions are positioned in the part where the positive bending moment generated in the bottom wall at the time of the action of the internal pressure and the negative bending moment generated in the lower curved surface portion are balanced, that is, in the part where extremely small stress is generated. Thus, the thickness of these thin portions can be more reduced, so that the weight of the pressure vessel can be further reduced.

In the present embodiment, the upper wall 1 and the bottom wall are square. Thus, an internal space of the pressure vessel is easily ensured.

Further, in the present embodiment, the ribs are provided in accordance with the stress distribution generated in the pressure vessel and the thickness of the ribs is changed. Thus, the generation of the non-uniformity of the stress distribution in the walls of the vessel can be suppressed, and the load can be efficiently applied over the entire pressure vessel.

It should be noted that the embodiment disclosed herein is not a limitation but an example in all respects. The range of the present invention is indicated not by the description of the above embodiment but by the claims, and further includes all equivalent meanings to the claims and all changes within the scope of the claims.

For example, the above embodiment shows the example that the upper wall 1 and the bottom wall are square. However, these walls are not limited to square but may have other polygonal shapes. It should be noted that even with other polygonal shapes, the same operations and effects as the case of square are obtained. In particular, in a case where the upper wall 1 and the bottom wall are regular square, the upper wall center rib 1b is formed in a cross shape including the upper wall center part 1a and connecting the facing sides, the bottom wall center rib is formed in a cross shape including the bottom wall center part and connecting the facing sides, and one main surface rib 2c is formed in each of the main surfaces 2a.

The above embodiment shows the example that the upper wall center rib 1b has the upper wall center rib thin portions 1e, the upper wall auxiliary ribs 1f have the upper wall auxiliary rib thin portions 1i, the upper wall annular ribs 1j have the upper wall annular rib thin portions 1m, the bottom wall center rib has the bottom wall center rib thin portions, bottom wall auxiliary ribs have bottom wall auxiliary rib thin portions, and the bottom wall annular ribs have the bottom wall annular rib thin portions. However, these thin portions may be omitted.

The above embodiment shows the example that the upper wall center rib 1b and the upper curved surface portion rib 3c, the upper wall annular ribs 1j and the upper curved surface portion ribs 3c, the bottom wall center rib and the lower curved surface portion rib, and the bottom wall annular ribs and the lower curved surface portion ribs are respectively connected by the curved surfaces. However, all these points may be connected by flat surfaces.

The above embodiment shows the example that the upper wall 1 has the upper wall auxiliary ribs 1f and the bottom wall has the bottom wall auxiliary ribs. However, these auxiliary ribs may be omitted. In that case, the required design conditions cannot be satisfied only by simply omitting the auxiliary ribs. Thus, there is a need for increasing width in the short direction (Y axis direction) of the center ribs of the upper wall and the bottom wall so that the center ribs can bear the load which is used to be applied onto these auxiliary ribs.

Next, an example of the pressure vessel of the present embodiment will be described in comparison to the conventional rectangular parallelepiped pressure vessel shown in FIG. 6.

Example

Figure 6:
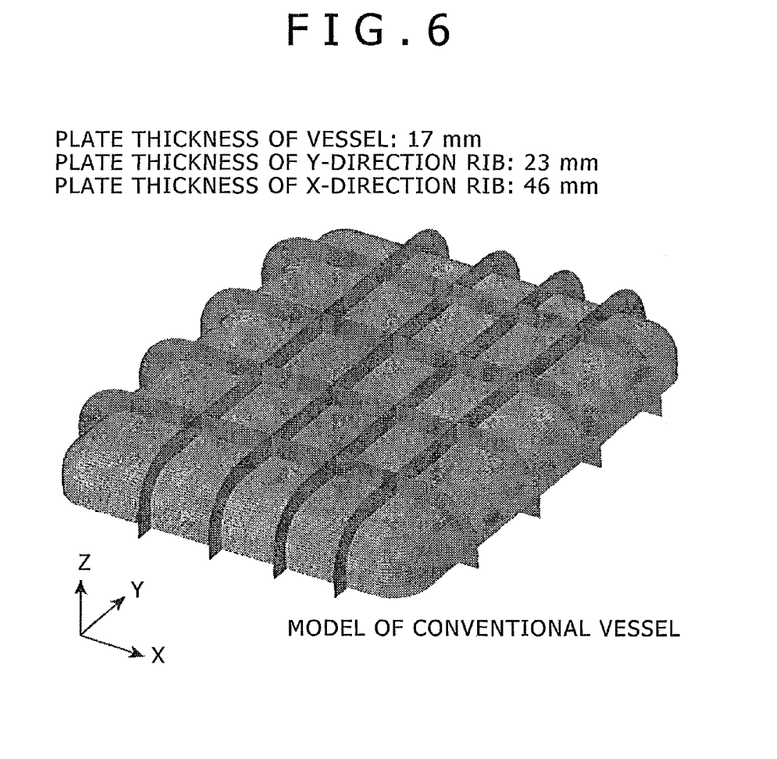
FIG. 6 is a perspective view of a half model of a conventional vessel in which grid shape ribs are provided.

FEM analysis models of the conventional rectangular parallelepiped pressure vessel shown in FIG. 6 and the pressure vessel of the present embodiment shown in FIG. 1 were made, and stress and displacement at the time of the action of the internal pressure were compared by elasto-plastic analysis. Weight was also compared. Major design conditions of rigidity and strength of the pressure vessel of the present embodiment, that is, the pressure vessel used as the compressor gas cooler are the following two points.
(1) A maximum displacement amount with maximum use pressure of 1.14 MPa (hereinafter, referred to as the "condition 1 value") is 2.5 mm or less.
(2) Maximum stress with minimum pressure fracture strength of 8.19 MPa (hereinafter referred to as the "condition 2 value") is 430 MPa or less.

It should be noted that although the present embodiment will be described hereinafter based on the example, the present embodiment is not limited to the following example as long as the embodiment does not exceed the gist thereof.

Comparative Example

FIG. 6 is the analysis model of the conventional rectangular parallelepiped pressure vessel having grid shape reinforcement ribs. This model is a shell element model and serves as an upper half model based on symmetry. Regarding size of this model, values of thickness center are 772.5 mm long, 631 mm wide, and 180 mm high, and plate thickness is 17 mm. Height of the ribs is 26.5 mm (26.5+17/2=35 mm on the shell model), thickness of the Y-direction ribs is 23 mm, and thickness of the X-direction ribs is 46 mm.

In this comparative example, weight of the entire vessel is 254 kg, the condition 1 value is 1.36 mm, and the condition 2 value is 425 MPa.

Example

Next, the example of the pressure vessel of the present embodiment shown in FIG. 1 will be described. Inner surface size of this model is 755.5 mm long, 614 mm wide, and 163 mm high. FCD450 is used as a material. In this example, weight of the entire vessel is 170 kg, the condition 1 value is 1.12 mm, and the condition 2 value is 420 MPa.

Figure 7:
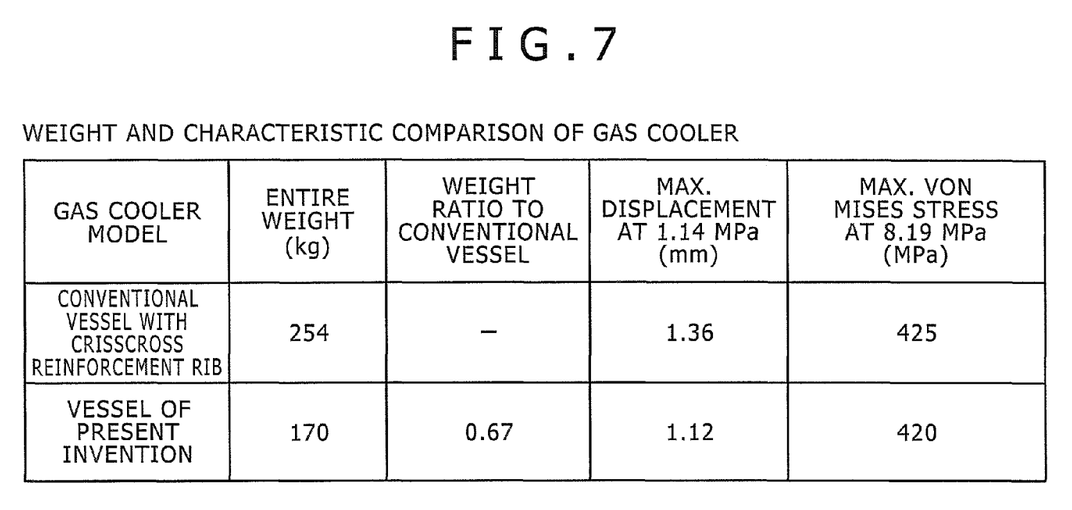
FIG. 7 is a view showing analysis results of a comparative example and an example.

FIG. 7 shows a table showing results of the above examples. As clear from FIG. 7, the pressure vessel of the present example can satisfy the design conditions and reduce the weight more than the conventional pressure vessel. More specifically, with the pressure vessel of the example, while a higher strength characteristic than the conventional pressure vessel is ensured, the weight can be about 67% of the conventional pressure vessel.

Figure 8:
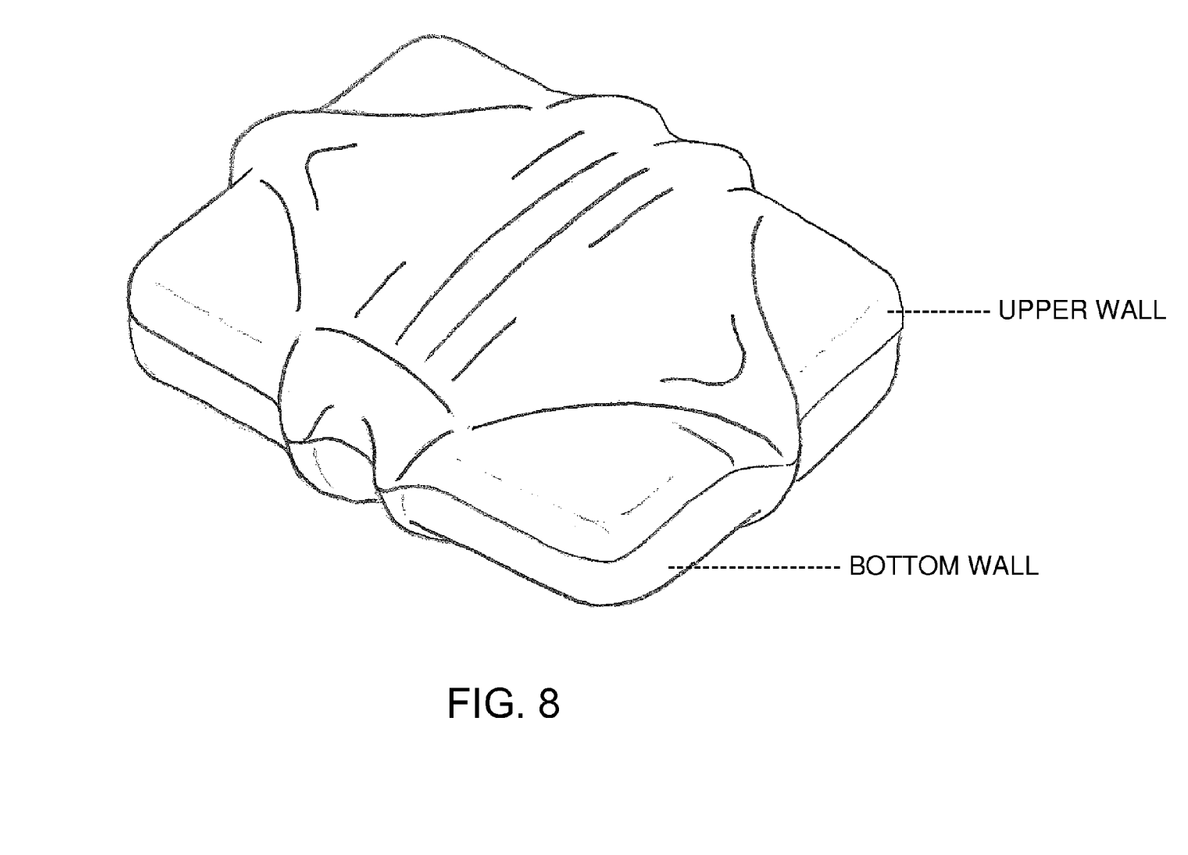
FIG. 8 is a perspective view of the assembled pressure according to the present invention.

FIG. 8 is a perspective view of the assembled pressure vessel according to the present invention, wherein the upper wall is assembled with the bottom wall to form the entire pressure vessel.

In the pressure vessel of the example, stress is substantially uniform over the substantially entire vessel excluding the corner portions, and as a result, the load is applied onto the vessel as a whole without any waste. Meanwhile, in a case of the conventional vessel shown in FIG. 6, the parts with relatively low stress are generated in a wide range in comparison to the example of the present embodiment, and as a result, the load is not efficiently applied onto the entire vessel.

What is claimed is:

1. A pressure vessel, having:
a polygonal upper wall;
a polygonal bottom wall provided on the lower side of said upper wall;
a side wall provided between a peripheral edge of said upper wall and a peripheral edge of said bottom wall corresponding to the peripheral edge of said upper wall;
an upper curved surface portion for connecting the peripheral edge of said upper wall and an upper end of said side wall by curved surfaces convexed outward; and
a lower curved surface portion for connecting the peripheral edge of said bottom wall and a lower end of said side wall by curved surfaces convexed outward, the pressure vessel comprising:
an upper wall center rib formed so as to include an upper wall center part in center of said upper wall and extend in a specific direction;
upper wall annular ribs formed so as to respectively connect substantially center parts of adjacent sides of said upper wall and surround said upper wall center rib;
upper curved surface portion ribs formed in substantially center parts of sides of said upper curved surface portion and provided continuously to said upper wall center rib and said upper wall annular ribs;
a bottom wall center rib formed so as to include a bottom wall center part in center of said bottom wall and extend in a specific direction;
bottom wall annular ribs formed so as to respectively connect substantially center parts of adjacent sides of said bottom wall and surround said bottom wall center rib;
lower curved surface portion ribs formed in substantially center parts of sides of said lower curved surface portion and provided continuously to said bottom wall center rib and said bottom wall annular ribs; and
main surface ribs formed in substantially center parts of main surfaces of said side wall and provided continuously to said upper curved surface portion ribs and said lower curved surface portion ribs.

2. The pressure vessel according to claim 1, wherein
said upper wall center rib has an upper wall center rib main body including said upper wall center part, an upper wall center rib continuous portion provided continuously to said upper curved surface portion rib, and an upper wall center rib thin portion formed between said upper wall center rib main body and said upper wall center rib continuous portion so as to be the thinnest in said upper wall center rib, and has a shape in which thickness thereof is gradually reduced from a center part of said upper wall center rib main body toward said upper wall center rib thin portion,
said upper wall annular rib has an upper wall annular rib main body, an upper wall annular rib continuous portion provided continuously to said upper curved surface portion rib, and an upper wall annular rib thin portion formed between said upper wall annular rib main body and said upper wall annular rib continuous portion so as to be the thinnest in said upper wall annular rib, said bottom wall center rib has a bottom wall center rib main body including said bottom wall center part, a bottom wall center rib continuous portion provided continuously to said lower curved surface portion rib, and a bottom wall center rib thin portion formed between said bottom wall center rib main body and said bottom wall center rib continuous portion so as to be the thinnest in said bottom wall center rib, and has a shape in which thickness thereof is gradually reduced from a center part of said bottom wall center rib main body toward said bottom wall center rib thin portion, and said bottom wall annular rib has a bottom wall annular rib main body, a bottom wall annular rib continuous portion provided continuously to said lower curved surface portion rib, and a bottom wall annular rib thin portion formed between said bottom wall annular rib main body and said bottom wall annular rib continuous portion so as to be the thinnest in said bottom wall annular rib.

3. The pressure vessel according to claim 2, wherein an inner surface of said upper curved surface portion and an inner surface of said lower curved surface portion have the same curvature radius, said upper wall center rib thin portion is positioned within a range of one half to twice more than the curvature radius from an inner surface of said side wall toward said upper wall center part when said upper wall is seen from the upper side, and said bottom wall center rib thin portion is positioned within a range of one half to twice more than the curvature radius from the inner surface of said side wall toward said bottom wall center part when said bottom wall is seen from the lower side.

4. The pressure vessel according to claim 2, wherein said upper wall center rib thin portion and said upper wall annular rib thin portion are positioned in a part where a positive bending moment generated in said upper wall at the time of action of internal pressure and a negative bending moment generated in said upper curved surface portion are balanced, and said bottom wall center rib thin portion and said bottom wall annular rib thin portion are positioned in a part where a positive bending moment generated in said bottom wall at the time of action of internal pressure and a negative bending moment generated in said lower curved surface portion are balanced.

5. The pressure vessel according to claim 1, wherein said upper wall and said bottom wall are square.

6. The pressure vessel according to claim 3, wherein said upper wall center rib thin portion and said upper wall annular rib thin portion are positioned in a part where a positive bending moment generated in said upper wall at the time of action of internal pressure and a negative bending moment generated in said upper curved surface portion are balanced, and said bottom wall center rib thin portion and said bottom wall annular rib thin portion are positioned in a part where a positive bending moment generated in said bottom wall at the time of action of internal pressure and a negative bending moment generated in said lower curved surface portion are balanced.

* * * * *